US008223849B2

United States Patent
Lu et al.

(10) Patent No.: US 8,223,849 B2
(45) Date of Patent: Jul. 17, 2012

(54) PICTURE DECODER, REFERENCE PICTURE INFORMATION COMMUNICATION INTERFACE, AND REFERENCE PICTURE CONTROL METHOD

(75) Inventors: Ying-Hung Lu, Kaohsiung County (TW); Yan-Tsung Peng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 469 days.

(21) Appl. No.: 12/485,893

(22) Filed: Jun. 16, 2009

(65) Prior Publication Data

US 2010/0208828 A1 Aug. 19, 2010

(30) Foreign Application Priority Data

Feb. 18, 2009 (TW) .................... 98105177 A

(51) Int. Cl.
*H04N 11/02* (2006.01)
(52) U.S. Cl. .................................. 375/240.25
(58) Field of Classification Search ............ 375/240.25; 711/158
See application file for complete search history.

(56) References Cited

U.S. PATENT DOCUMENTS

| | | | | |
|---|---|---|---|---|
| 5,752,266 A | * | 5/1998 | Miyawaki et al. | 711/158 |
| 6,366,289 B1 | * | 4/2002 | Johns | 345/543 |
| 7,218,676 B2 | * | 5/2007 | Kono et al. | 375/240.25 |
| 7,434,223 B2 | * | 10/2008 | Diepstraten et al. | 718/108 |
| 7,711,990 B1 | * | 5/2010 | Nickolls et al. | 714/37 |
| 2009/0016437 A1 | * | 1/2009 | Takahashi et al. | 375/240.16 |

* cited by examiner

*Primary Examiner* — David Czekaj
*Assistant Examiner* — Leron Beck
(74) *Attorney, Agent, or Firm* — Jianq Chyun IP Office

(57) ABSTRACT

A reference picture information communication interface implemented in a hardware/software integrated H.264 encoder/decoder is provided. The reference picture information communication interface includes a reference state register (RSR) and a reconstruct address register (RAR). The RSR has N bits, wherein N represents the maximum number of reference pictures supported by the H.264 encoder/decoder. The RSR is used by the hardware for notifying a software decoded picture buffer (DPB) controller about a current reference picture existence information. The RAR is used by the software for notifying the H.264 encoder/decoder about an address of a reconstruction information of a currently decoded picture in a memory space.

13 Claims, 3 Drawing Sheets

US 8,223,849 B2

PICTURE DECODER, REFERENCE PICTURE INFORMATION COMMUNICATION INTERFACE, AND REFERENCE PICTURE CONTROL METHOD

CROSS-REFERENCE TO RELATED APPLICATION

This application claims the priority benefit of Taiwan application serial no. 98105177, filed on Feb. 18, 2009. The entirety of the above-mentioned patent application is hereby incorporated by reference herein and made a part of specification.

BACKGROUND OF THE INVENTION

1. Field of the Invention

The present invention generally relates to a video decoding technique, and more particularly, to a reference picture control method conforming to the H.264 compression protocol.

2. Description of Related Art

MPEG video compression format is a commonly used compression format for compressing digital videos, especially for compressing animated data. FIG. 1 is a diagram of a conventional compressed video stream and a bitstream decoding order 100 and a video display order 102 thereof. In the bitstream decoding order 100, the pictures are in the order from 1 to 7, and the pictures have three different encoding patterns I, P, and B. The pictures encoded with the pattern I can be decoded without referring to any other picture. The pictures encoded with the pattern P can be decoded by referring to a previous picture having the encoding pattern I or P to increase the compression ratio. The pictures encoded with the pattern B can be decoded by referring to both a previous picture (forward prediction) and a next picture (backward prediction) in the video display order, and a picture encoded with the pattern B cannot be used for reference by any other picture. The decoded pictures are in the order of 1, 3, 4, 2, 6, 7, and 5 when they are displayed according to the video display order.

Based on foregoing video display order, the reference relationship between the pictures is as shown in FIG. 2. FIG. 2 is a diagram illustrating the storage of reference pictures during a conventional decoding process. During the conventional decoding process, a reference picture is stored in a memory and is only removed when the picture is not needed anymore. Referring to FIG. 2, the arrows indicate the reference relationship between the pictures. For example, the picture I(1) is referred when subsequently the pictures B(3), B(4), and P(2) are decoded.

However, the decoder cannot store all the decoded pictures due to the limited memory space. Accordingly, an efficient memory management is necessary. When a picture is already displayed and will not be used for reference, the memory space taken by this picture should be released for storing another decoded picture.

Table 1 shows the temporary storage states of reference pictures. After the picture I(1) is decoded, because the picture I(1) is temporarily stored since it will be used for reference by subsequent pictures.

After the picture P(2) is decoded, the picture P(2) is also temporarily stored since it will be used for reference by subsequent pictures. Meanwhile, the picture I(1) is still kept in the memory since it is still needed. After the picture B(3) is decoded, because the picture B(3) is not displayed yet, the picture B(3) is kept in the memory. Meanwhile, the pictures I(1) and P(2) are still kept in the memory since they are still needed by subsequent pictures. After the picture B(4) is decoded, the picture I(1) is not needed anymore therefore is removed. At this time, the picture B(4) is kept in the memory since it is not displayed yet. As described above, the reference states of all the pictures can be obtained as:

TABLE 1

| Decoding state | Storage state |
| --- | --- |
| #1 complete | I(1) |
| #2 complete | I(1), P(2) |
| #3 complete | I(1), P(2), B(3) |
| #4 complete | P(2), B(4) |
| #5 complete | P(2), P(5) |
| #6 complete | P(2), P(5), B(6) |
| #7 complete | P(5), B(7) |

It can be understood from foregoing example that in the conventional video coding standard, the memory space can be correctly organized and released as along as whether the currently decoded picture is encoded with the pattern I, P, or B and whether there is any picture encoded with the pattern B in the video display order are determined.

Another broadly used compression technique is the H.264/AVC technique. The H.264/AVC technique is a new generation video coding standard established by a joint video team (JVT) which consists of two video compression standard organizations: the moving picture experts group (MPEG) of ISO/IEC and the video coding experts group (VCEG) of ITU-T. The H.264/AVC technique has become a standard function of digital video/audio products thanks to the powerful compression capability it offers.

However, in the H.264/AVC compression protocol, the encoding patterns I, P, and B are defined differently. In addition, the H/264 standard allows at most 16 reference pictures. Thus, the simple mechanism for organizing and releasing memory space in the MPEG standard is not applicable to the H/264 standard.

SUMMARY OF THE INVENTION

Accordingly, the present invention is directed to a picture decoder, wherein the temporary storage states of reference pictures can be effectively managed so that the memory space for storing those pictures which are not needed anymore can be instantly released.

The present invention is also directed to a reference picture information communication interface, wherein the temporary storage states of reference pictures can be effectively managed so that the memory space for storing those pictures which are not needed anymore can be instantly released.

The present invention is further directed to a reference picture control method, wherein the temporary storage states of reference pictures can be effectively managed so that the memory space for storing those pictures which are not needed anymore can be instantly released.

The present invention provides a picture decoder coupled to a host controller, wherein the host controller is used for encoding/decoding video data. The picture decoder includes a decoded picture buffer (DPB) controller, a picture storage, a reference status register (RSR), a reconstruct address register (RAR), and a decoder. The picture storage has a plurality of reference picture storage spaces and a reconstructed picture space, wherein the reference picture storage spaces have a sequence state. The RSR is coupled to the DPB controller and stores a usage state of the reference picture storage spaces, wherein those unused reference picture storage spaces are released. The RAR is coupled to the DPB controller. The decoder is coupled to the host controller, the RSR, the RAR, and the picture storage. After the host controller decodes a header information of an input picture, the host controller determines whether the input picture will be used for reference subsequently and starts the DPB controller. The DPB controller determines a reconstruct address of a picture to be decoded and stores the reconstruct address into the RAR. After that, the host controller starts the decoder to execute a video decoding. After the decoder completes the video decoding, the decoder fills a reconstruct information into the reconstructed picture space according to the reconstruct address and updates the usage state of the RSR. The host controller continues to decode a next picture after the decoder completes the video decoding.

The present invention provides a reference picture information communication interface, wherein the reference picture information communication interface is disposed in a video encoder/decoder conforming to the H/264 compression protocol to be used by a DPB controller. The reference picture information communication interface includes a RSR and a RAR. The RSR has N bits, wherein N represents the maximum number of reference pictures supported by the video encoder/decoder. The RSR is used by the hardware for notifying the DPB controller of a current reference picture existence state. The RAR provides an information to notify the video encoder/decoder about a storage address of a reconstruct information of a currently decoded picture in a memory space.

The present invention provides a reference picture control method for decoding pictures in a hardware decoding system. In the present method, a header information of an input video picture is obtained through a host controller, and whether the video picture will be used for reference in subsequent decoding process is determined according to the header information. Then, the video picture is decoded by using a decoder to obtain a reconstruct information, wherein a reference picture existence state used in the decoding process is updated. The reference picture existence state is recorded by using a RSR. The storage space of at least one reference picture which is not needed anymore is released according to the reference picture existence state.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
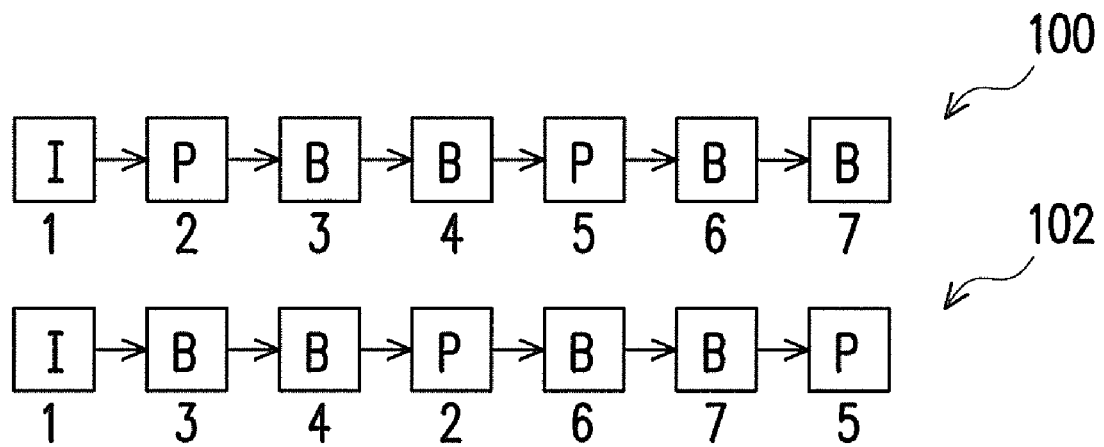
FIG. 1 is a diagram of a conventional compressed video stream and a bitstream decoding order and a video display order thereof.

Reference will now be made in detail to the present preferred embodiments of the invention, examples of which are illustrated in the accompanying drawings. Wherever possible, the same reference numbers are used in the drawings and the description to refer to the same or like parts.

In the H.264/AVC standard, a decoded picture buffer (DPB) controller is specified for accessing all the reference pictures and decoded pictures required for decoding and displaying a picture. As to the DPB controller, it is the most important to know when a reference picture stored in the memory space is not needed anymore. Once a reference picture is not needed, the DPB controller can determine when to release the memory space of the unused reference picture according to a video display order and some other information. In a typical method for using reference pictures according to the H.264/AVC standard, the number of reference pictures to be used is not determined based on the encoding patterns of the pictures but on a slice attribute thereof. An I slice can be decoded without referring to any other picture, a P slice can be decoded by referring to a reference picture selected from a reference list RefList0, and a B slice can be decoded by referring to a reference picture selected from the reference list RefList0 and/or a reference picture selected from a reference list RefList1. For example, in each slice, each 8×8 block is decoded by referring to a different reference picture; however, the reference list and the number of reference pictures to be selected are already restricted by the slice attribute. In addition, after a picture is decoded, the decoder determines which reference picture will not be used for reference according to the information in the slice header. In this step, it may be determined that all the existing reference pictures are kept, one or more reference pictures are discarded, or all the reference pictures are discarded.

A discarded reference picture is removed from the reference list when a next picture is decoded. However, besides removing the discarded reference pictures, some other reference pictures are added into the reference list. When a picture is decoded, whether this picture can be used for reference is determined according to the header information on the network abstraction layer (NAL). If this picture can be used for reference, the picture is added into the reference list; otherwise, the picture is not added into the reference list. However, it should be noted that the reference pictures are removed before the current picture is added into the reference list. Accordingly, the removing instruction does not remove the current reference picture except that the current picture cannot be used for reference. It can be understood from foregoing description that after each picture is decoded, the reference list may have following states:

1. first removing 0 picture from all the reference pictures;
2. adding 0 or 1 reference picture.

Figure 2:
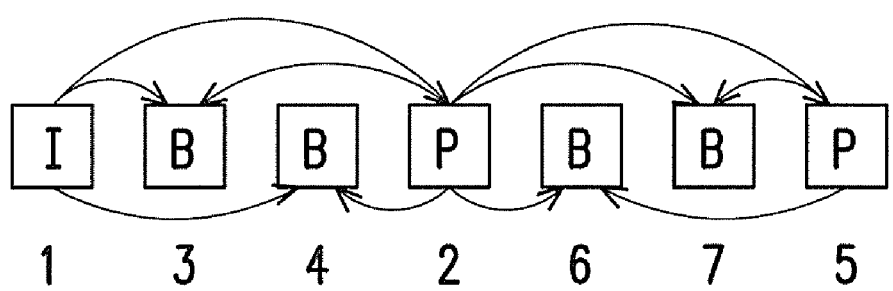
FIG. 2 is a diagram illustrating the storage of reference pictures during a conventional decoding process.

This process is more flexible but also more complicated than the standard method illustrated in FIGS. 1~2. In a conventional hardware/software integrated decoding framework, the hardware portion is used for accelerating the decoding of a NAL unit containing slice information, and the software portion is used for decoding the other NAL units and controlling the operation of the DPB. Because the reference picture information is encoded in the slice header, it is decoded by the hardware portion. Accordingly, the hardware has to transmit the information of all the added and removed reference pictures to the software in order to control the operation of the DPB. Since the DPB is controlled by the software, the software has to provide the storage addresses of all the reference pictures and the picture to be decoded in the memory space to the hardware. The H.264/AVC standard specifies that at most 16 reference pictures can be stored, and through the conventional interface, the information of each picture has to be transmitted between the software and the hardware. As a result, such an interface is very complicated and the hardware cost is very high. The present invention provides an interface which can be applied to a software/hardware integrated H.264/AVC decoder for transmitting the information of reference pictures. This interface offers both a simple design and a low hardware cost.

Accordingly, the present invention further provides an interface for transmitting the information of reference pictures, so as to manage the storage of the reference pictures effectively and release the storage space of those unused reference pictures instantly.

Figure 3:
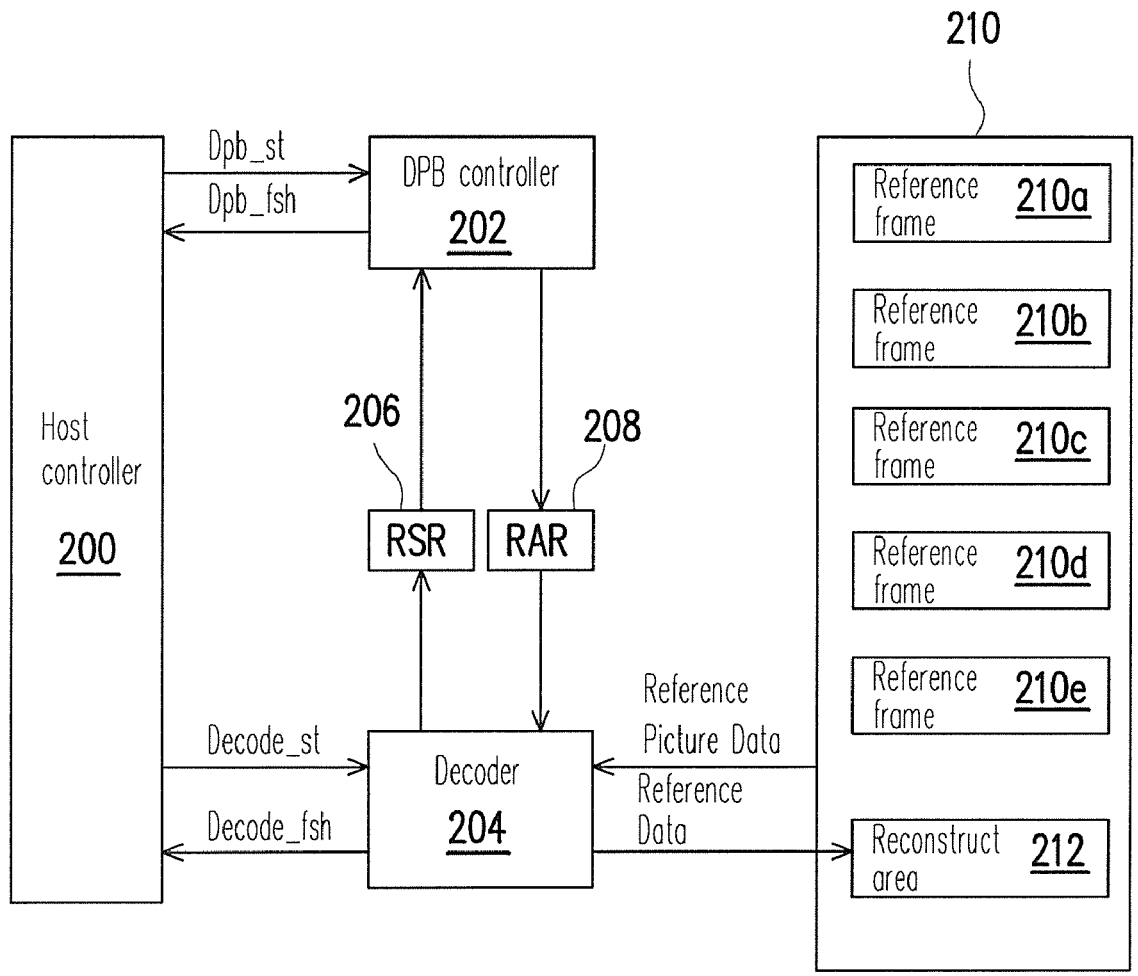
FIG. 3 is a schematic diagram of a picture decoder conforming to the H.264/AVC standard according to an embodiment of the present invention.

The present invention provides an interface for transmitting information of reference pictures. This interface is disposed in a hardware/software integrated H.264/AVC encoder/decoder. FIG. 3 is a schematic diagram of a picture decoder conforming to the H.264/AVC standard according to an embodiment of the present invention.

The picture decoder is coupled to a host controller for encoding/decoding video data. The picture decoder includes a DPB controller, a picture storage, a RSR, a RAR, and a decoder. The picture storage has a plurality of reference picture storage spaces and a reconstructed picture space, wherein the reference picture storage spaces have a sequence state. The RSR is coupled to the DPB controller and stores a usage state of the reference picture storage spaces, wherein those reference picture storage spaces which are not currently used are released. The RAR is coupled to the DPB controller. The decoder is coupled to the host controller, the RSR, the RAR, and the picture storage. After the host controller decodes a header information of an input picture, the host controller determines whether the input picture will be used for reference subsequently and starts the DPB controller. The DPB controller determines a reconstruct address of a picture to be decoded and stores the reconstruct address into the RAR. After that, the host controller starts the decoder to execute a video decoding. After the decoder completes the video decoding, the decoder stores a reconstruct information into the reconstructed picture space according to the reconstruct address and updates the usage state of the RSR. After the decoder finishes the video decoding, the host controller continues to decode a next picture.

Referring to FIG. 3, the picture decoder is coupled to a host controller 200 which is used for encoding/decoding video data. The picture decoder includes a DPB controller 202, a picture storage 210, a RSR 206, a RAR 208, and a decoder 204. The DPB controller 202 is a software controller and which manages reference pictures according to the H/264 standard. The picture storage 210 has a plurality of reference picture storage spaces 210a~210e and a reconstructed picture space 212. The reconstructed picture space 212 is also referred to as a reconstruct area 212. The addresses of the reference picture storage spaces 210a~210e and the reconstructed picture space 212 are not fixed but are determined through an actual operation, wherein the reconstructed picture space 212 may also be any usable space in the picture storage 210 appointed by the RAR 208. The reference picture storage spaces 210a~210e have a sequence state. The RSR 206 is coupled to the DPB controller 202 and stores a usage state of the reference picture storage spaces 210a~210e. Those unused storage spaces among the reference picture storage spaces 210a~210e are released.

The RAR 208 is coupled to the DPB controller 202. The decoder 204 is coupled to the host controller 200, the RSR 206, the RAR 208, and the picture storage 210. After the host controller 200 decodes a header information of an input picture, the host controller 200 determines whether the input picture will be used for reference subsequently and starts the DPB controller 202. The DPB controller 202 determines a reconstruct address of a picture to be decoded and stores the reconstruct address into the RAR 208. After that, the host controller starts the decoder to execute a video decoding. After the decoder 204 completes the video decoding, the decoder 204 stores a reconstruct information into the reconstructed picture space 212 according to the reconstruct address and updates the usage state of the RSR. After the decoder completes the video decoding, the host controller 200 continues to decode a next picture.

The decoding process will be described herein. The host controller 200 first decodes the header information of a H/264 picture and sends necessary information to the DPB controller 202. After that, the host controller 200 issues a signal Dpb_st to start the DPB controller 202.

After the DPB controller 202 receives the signal Dpb_st, it determines the reconstruct address of a next picture to be decoded according to the header information transmitted by the host controller 200, the current sequence state of the storage spaces in the DPB controller 202, and the state of the RSR 206 and stores the reconstruct address into the RAR 208. After that, the DPB controller 202 issues a signal Dpb_fsh to notify the host controller 200 and terminates the operation of the DPB controller 202.

After the host controller 200 receives the signal Dpb_fsh, it issues a signal Decode_st such that the hardware decoder 204 can start to decode. After the decoder 204 finishes decoding a complete picture, it stores the reconstruct data into the appointed memory space (i.e., the reconstructed picture space 212) according to the instruction of the RAR 208 and updates the state of the RSR 206. As described above, the reconstructed picture space 212 is a temporary address instead of a fixed address. Thereafter, the decoder 204 issues a signal Decode_fsh to notify the host controller 200 and terminates the decoding of this picture.

After receiving the signal Decode_fsh, the host controller 200 starts to decode the header information of a next picture and then repeats foregoing steps until the entire video stream is decoded.

As shown in FIG. 3, the interface for transmitting information of reference pictures includes a N-bit RSR 206, wherein N represents the maximum number of reference pictures supported by the encoder/decoder, for example, 0<N≦16. The RSR 206 is used by the hardware for notifying the software DPB controller 202 of the current reference picture existence information. The RAR 208 is used by the software for notifying the hardware decoder 204 about the address of the reconstruct information of the currently decoded picture in the memory space.

The operation of the hardware/software integrated H.264/AVC encoder/decoder will be described herein. A hardware decoder 204 is used for accelerating the decoding of bitstream of NAL unit types 1, 2, 3, 4, and 5 below the slice data layer. The hardware decoder 204 can reconstruct a decoded reconstruct picture according to this data through an existing decoding procedure and stores the reconstruct picture into an appointed memory space.

A software DPB controller 202 is used for controlling a DPB, such as a picture storage 210.

A host controller 200 is used for controlling the operation of the hardware decoder 204 and the software DPB controller 202 and provides the information required for decoding a picture to foregoing two modules.

Another embodiment of the present invention will be described below to further explain the technique provided by the present invention. In the present embodiment, the state of the RSR 206 and the relationship between the states of all the reference pictures in the picture storage 210 and the DPB controller 202 will be explained. Table 2 shows the characteristics of all pictures to be decoded in the present embodiment. Because in the H/264 standard, I, P, and B are no longer related to whether a picture is used for reference, in the present embodiment, whether a picture is used for reference and the number of the picture are simply provided. The frame number is the number of a picture to be processed, and which is corresponding to a data segment of a fixed length in the video stream.

TABLE 2

| Frame number | Used for reference |
| --- | --- |
| 0 | Yes |
| 1 | Yes |
| 2 | Yes |
| 3 | Yes |
| 4 | No |
| 5 | Yes |

Figure 4:
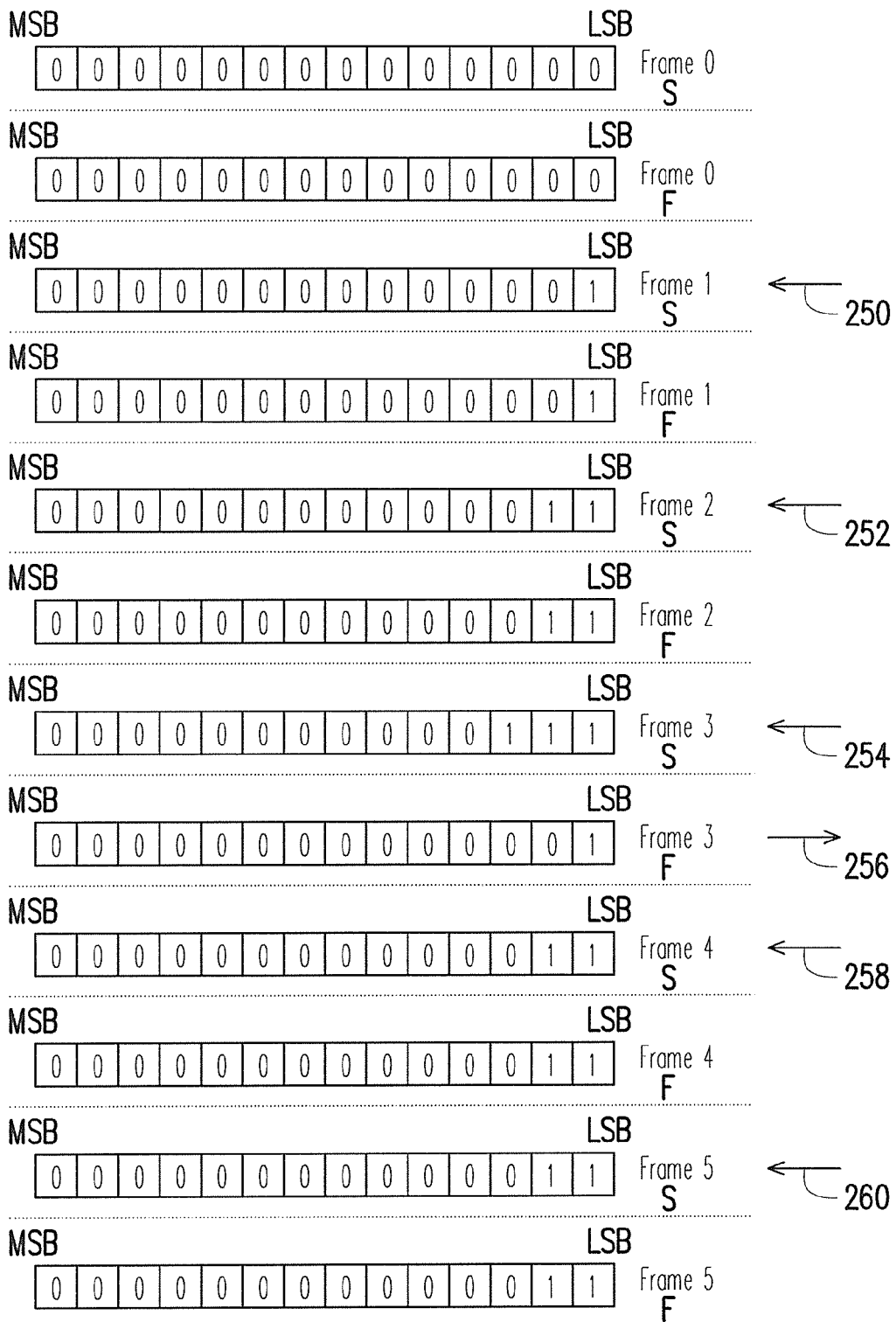
FIG. 4 is a diagram illustrating the corresponding state of a reference state register (RSR) during a decoding process as shown in table 3 according to an embodiment of the present invention.

Table 3 shows the states of the reference list and the DPB and the values filled in the RAR during the decoding process. FIG. 4 is a diagram illustrating the corresponding state of a RSR during a decoding process according to an embodiment of the present invention. Referring to FIG. 4, the operation flow in the present invention will be described below with reference to table 3. S in FIG. 4 represents that the decoding of a frame is started, F represents that the decoding of the frame is completed, and MSB and LSB represent two end bits of a 16-bit space.

TABLE 3

| Decoding state | State of reference frame | RAR value | Free space in DPB |
| --- | --- | --- | --- |
| Initial | No | A | A, B, C, D, E |
| Frame 0 starts | No | A | B, C, D, E |
| Frame 0 ends | Frame 0 | B | C, D, E |
| Frame 1 starts | Frame 0 | B | C, D, E |
| Frame 1 ends | Frames 0, 1 | C | D, E |
| Frame 2 starts | Frames 0, 1 | C | D, E |
| Frame 2 ends | Frames 0, 1, 2 | D | E |
| Frame 3 starts | Frames 0, 1, 2 | D | E |
| Frame 3 ends | Frames 0, 3 | B | C, E |
| Frame 4 starts | Frames 0, 3 | B | C, E |
| Frame 4 ends | Frames 0, 3 | C | E |
| Frame 5 starts | Frames 0, 3 | C | E |
| Frame 5 ends | Frames 0, 3, 5 | B | E |

At the beginning, it is assumed that a free space for storing 5 pictures in the picture storage 210 of the DPB is available, and this free space includes reference picture storage spaces 210a~210e and a reconstruct area 212. After the host controller 200 starts the DPB controller 202, the DPB controller 202 understands the current decoding state from the information of the host controller 200 and select the free space A from the 5 free spaces A, B, C, D, and E and fills A into the RAR as the address of the reconstructed picture of the frame 0 in the memory space, wherein A is the reconstructed picture space. Herein the RSR in FIG. 4 is at an initial state and accordingly the 16 bits thereof all have a value 0.

Frame 0S represents that the decoding of frame 0 is started but not yet completed. In the picture storage 210, since A is already used by the frame 0, only the free spaces B, C, D, and E are left, and herein the RSR remains in the initial state and the 16 bits thereof all have the value 0.

Frame 0F represents that the decoding of the frame 0 is completed and the decoder 204 already stores the reconstruct data of the frame 0 into the address A of the picture storage 210. Table 2 shows that the frame 0 can be used for reference. Thus, the frame 0 is added into the reference list to be referred by a next picture. The host controller 200 is notified after the hardware decoding is completed, as shown in FIG. 3. The host controller 200 then notifies the DPB controller 202. The DPB controller 202 stores B into the RAR as the reconstruct address of the frame 1 and then notifies the host controller to start the hardware decoder. Herein the state of the RSR is not changed.

Frame 1S represents that the decoding of the frame 1 is started (as denoted by the arrow 250) but not yet completed. Because the previous frame 0 has been added into the reference list, the RSR fills 1 into the bit which is closet to the LSB and has a value 0 (as denoted by the arrow 250) to indicate that the previous frame has been added into the reference list. Thereafter, this bit indicates the existence of the frame 0 in the reference list. If this bit is changed to 0, it means the frame 0 does not exist in the reference list and the memory space thereof can be released. Since the DPB controller 202 also receives the information in table 2 from the host controller 200, the operation of the RSR is simulated by the DPB controller 202 to change the value of the bit from 0 to 1.

Frame 1F is similar to frame 0F, wherein the frame 1 is added into the reference list, and the DPB controller 202 is notified to fill C into the RAR and terminate the decoding of the current picture.

Frame 2S is similar to frame 1S (as denoted by arrow 252), wherein 0000_0000_0000_0011 is filled into the 16 bits of the RSR, which means the frame 1 is also added into the reference list. Meanwhile, the DPB controller 202 simulates this operation.

Frame 2F is similar to frame 1F and which will not be described herein.

Frame 3S is similar to frame 1S (as denoted by arrow 254), wherein the frame 3 is added into the reference list and which will not be described herein.

Regarding frame 3F (as denoted by arrow 256), during the decoding process of the frame 3, the hardware decoder understands according to the slice header that the frames 1 and 2 are removed from the reference list and will not be used for reference. Thus, the hardware decoder changes the two bits in the RSR corresponding to the frames 1 and 2 into 0 and then terminates the decoding of the current picture. Herein, the state of the RSR is 0000_0000_0000_0001. After that, the host controller notifies the DPB controller to start controlling the DPB. As described above, the RSR state simulated in the DPB is 0000_0000_0000_0111. Because this state is different from the actual RSR state, the DPB compares the simulated RSR state and the actual RSR state and finds out that the bits 1 and 2 are both changed to 0, which means the frames 1 and 2 have been removed from the reference list during the decoding process. Then, the DPB controller synchronize the simulated RSR state and the actual RSR state to record the actual RSR state. After that, the DPB controller appoints the memory spaces B and C originally taken by the frames 1 and 2 as free spaces, and then selects the free space B from the existing free spaces B, C, and E and fills B into the RAR. By now, only the free spaces C and E are left. The process then continues to decode a next picture.

Frame 4S is similar to frame 1S (as denoted by arrow 258). However, it should be noted that the RSR state simulated by the DPB controller 202 is obtained by adding the bit of frame 3 to the value obtained from the previous picture. Herein in the RSR, bit 0 represents frame 0 and bit 1 represents frame 3.

In the state of frame 4F, as shown in table 2, the frame 4 cannot be used for reference. Thus, the frame 4 is not added into the reference list. Accordingly, the state of the reference list remains the same, as shown in table 3. Because the frame 4 is just decoded and not yet displayed, the memory space taken by the frame 4 cannot be released yet. The DPB controller 202 then selects the free space C from the free spaces C and E, fills C into the RAR, and continues to decode a next picture.

In the state of frame 5S (as denoted by arrow 260) because the frame 4 is not added into the reference list, the state of the RSR is not updated. The other states are as described above.

Regarding the state of frame 5F, in the present example, assuming the frame 4 is displayed when the frame 5 is decoded, then the memory space B taken by the frame 4 can be used. After the frame 5 is decoded, the DPB controller releases the space B and fills B into the RAR to be used by the next picture. Herein only the free space E is left, as shown in table 3. Because there is no picture removed from the reference list, the DPB controller 202 continues to use the currently simulated RSR state for controlling the access to the picture storage 210 of the DPB.

As described in foregoing embodiment, in the present invention, a software DPB controller notifies a hardware decoder to fill a reconstructed picture into a correct memory space. When the hardware decoder decodes the slice header, the software DPB controller is notified of the picture removed from the reference list through the state of the RSR after a picture is decoded. The steps are as following.

When the decoding of a picture is started, the hardware decoder updates the RSR according to the state of a previous picture based on following rules:

If the previous picture cannot be used for reference, the hardware decoder does not update the RSR;

If the previous picture can be used for reference, the bit in the RSR which is closest to the LSB and has a value 0 is changed to 1. Thereinafter, this value indicates the existence of the picture in the reference list; and When the hardware decoder starts to decode a picture, the software DPB controller simulates the operation of the hardware decoder according to the information transmitted by the host controller and the latest state of the RSR.

When the decoding of a picture is completed, the hardware decoder determines which pictures are to be removed from the reference list according to the slice header based on following rules:

If there is no picture removed from the reference list, the RSR is not updated;

If there is picture removed from the reference list, the bit corresponding to the picture in the RSR is set to 0;

The hardware decoder stores the reconstructed picture information into the appointed memory space in the RAR and notifies the host controller to terminate the hardware decoding and start the DPB controller; and The DPB controller detects which bits are changed from 1 to 0.

As long as there is a bit which is changed from 1 to 0, it means the memory space corresponding to this bit is not used anymore and therefore can be released. An address is selected from the free spaces and filled into the RAR as the memory space address for storing the reconstructed picture of a next picture to be decoded.

Through foregoing two steps, information of reference pictures can be transmitted between the hardware and the software through the two simple registers RSR and RAR.

It should be understood that foregoing embodiments of the present invention are not intended fro limiting the scope of the present invention, and these embodiments can be appropriately integrated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A picture decoder, coupled to a host controller for encoding/decoding video data based on a H.264 standard, the picture decoder comprising:

a decoded picture buffer (DPB) controller, for accessing reference pictures and a decoded picture when a picture is decoded and displayed;

a picture storage, having a plurality of reference picture storage spaces and a reconstructed picture space, wherein the reference picture storage spaces have a sequence state;

a reference state register (RSR), coupled to the DPB controller, for storing a usage state of the reference picture storage spaces, wherein the unused reference picture storage spaces among the reference picture storage spaces are released;

a reconstruct address register (RAR), coupled to the DPB controller; and a decoder, coupled to the host controller, the RSR, the RAR, and the picture storage, wherein after the host controller decodes a header information of an input picture, the host controller determines whether the input picture is used for reference subsequently and starts the DPB controller, and the DPB controller determines a reconstruct address of a picture to be decoded and stores the reconstruct address into the RAR, wherein after the DPB controller stores the reconstruct address into the RAR, the host controller starts the decoder to execute a video decoding, and after the decoder completes the video decoding, the decoder fills a reconstruct information into the reconstructed picture space according to the reconstruct address and updates the usage state of the RSR, wherein the decoder updates the RSR about the reference pictures being currently referred and the DPB also simulates the RSR as a simulated RSR state, wherein after the host controller notifies the DPB controller to start controlling function, the DPB controller compares the simulated RSR state with the RSR to find out the difference in the bits, which indicating the reference pictures being currently removed, wherein the DPB controller updates the simulated RSR state with the RSR and updates the usage state of the reference picture storage spaces in the RAR to release the reference picture storage spaces for the reference pictures being currently removed, wherein after the decoder completes the video decoding, the host controller continues to decode a next picture.

2. The picture decoder according to claim 1, wherein the DPB controller is implemented in a software format.

3. The picture decoder according to claim 1, wherein the host controller decodes a header data of a picture compressed according to the H.264 standard.

4. The picture decoder according to claim 1, wherein the RSR comprises a plurality of bits, and each of the bits is corresponding to one of the reference picture storage spaces to indicate the usage state of the reference picture storage space.

5. The picture decoder according to claim 1, wherein after the usage state of the RSR is updated, the unused reference picture storage spaces among the reference picture storage spaces are released.

6. A reference picture information communication interface, implemented in a video encoder/decoder conforming to a H.264 compression protocol to be used by a decoded picture buffer (DPB) controller, the reference picture information communication interface comprising:

a reference state register (RSR), having N bits, wherein N represents a maximum number of reference pictures supported by the video encoder/decoder, and the RSR is used by a hardware portion for notifying the DPB controller of a current reference picture existence state, wherein the DPB controllers also simulate a simulated RSR state for comparing a RSR state stored in the RSR to find out which of the reference pictures is currently removed no longer being used; and a reconstruct address register (RAR), coupled to the DPB controller to known the reference pictures being currently removed and for providing an information to notify the video encoder/decoder of a storage address of a reconstruct information of a currently decoded picture in a memory space, wherein a portion of the memory space occupied by the reference pictures being currently removed is immediately released.

7. The reference picture information communication interface according to claim 6, wherein $0<N\leq16$.

8. The reference picture information communication interface according to claim 6, wherein the RSR is implemented in a hardware format.

9. The reference picture information communication interface according to claim 6, wherein the RAR is implemented in a hardware format.

10. A reference picture control method, for decoding a video picture in a hardware decoding system based on a H.264 compression protocol, the reference picture control method comprising:

obtaining a header information of an input video picture by using a host controller to determine whether the video picture is used for reference subsequently;

decoding the video picture by using a decoder to obtain a reconstruct information, wherein a reference picture existence state used in the decoding process is updated;

recording the reference picture existence state, which is provided by decoding the video picture, by using a reference state register (RSR);

releasing a storage space of at least one reference picture which is not needed according to the reference picture existence state stored in the RSR and; wherein the decoder updates the RSR about the reference pictures being currently referred and a DPB also simulates the RSR as a simulated RSR state, wherein after the host controller notifies the DPB controller to start controlling function, the DPB controller compares the simulated RSR state with the RSR to find out the difference in bits, which indicating the reference pictures being currently removed, wherein the DPB controller updates the simulated RSR state with the RSR and updates the usage state of the reference picture storage spaces in a reconstruct address register (RAR) to release the reference picture storage spaces for the reference pictures being currently removed.

11. The reference picture control method according to claim 10, wherein the video picture is compressed according to the H.264 compression protocol.

12. The reference picture control method according to claim 10, wherein the host controller determines whether the video picture is used for reference subsequently.

13. The reference picture control method according to claim 10 further comprising updating the reference picture existence state and determining a storage address for storing the reconstruct information by using a decoded picture buffer (DPB) controller.

* * * * *